(12) United States Patent
Tsukahara et al.

(10) Patent No.: US 8,988,348 B2
(45) Date of Patent: Mar. 24, 2015

(54) INFORMATION PROCESSING DEVICE, INFORMATION PROCESSING SYSTEM AND INFORMATION PROCESSING METHOD

(75) Inventors: Tsubasa Tsukahara, Tokyo (JP); Tetsuro Goto, Tokyo (JP); Shinobu Kuriya, Kanagawa (JP); Kenichi Kabasawa, Saitama (JP); Masatoshi Ueno, Kanagawa (JP); Hideo Kawabe, Saitama (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 13/314,439

(22) Filed: Dec. 8, 2011

(65) Prior Publication Data

US 2012/0154387 A1  Jun. 21, 2012

(30) Foreign Application Priority Data

Dec. 15, 2010  (JP) ................................. 2010-278809

(51) Int. Cl.
*G06F 3/033* (2013.01)
*G06F 3/0346* (2013.01)

(52) U.S. Cl.
CPC .................................... *G06F 3/0346* (2013.01)
USPC ........................................................ 345/158

(58) Field of Classification Search
USPC .......................................... 345/158; 702/152
See application file for complete search history.

(56) References Cited

U.S. PATENT DOCUMENTS

| 2005/0258718 | A1 | 11/2005 | Bodinger et al. |
| 2006/0146009 | A1* | 7/2006 | Syrbe et al. ................. 345/156 |
| 2007/0257885 | A1* | 11/2007 | Liberty ........................ 345/158 |
| 2007/0273645 | A1* | 11/2007 | Bang et al. ................... 345/157 |

FOREIGN PATENT DOCUMENTS

| JP | 2005-331265 A | 12/2005 |
| JP | 2006-501119 A | 1/2006 |
| JP | 2012-508417 A | 4/2012 |
| WO | WO 2010/056024 A2 | 5/2010 |

* cited by examiner

*Primary Examiner* — Sahlu Okebato
(74) *Attorney, Agent, or Firm* — Wolf, Greenfield & Sacks, P.C.

(57) ABSTRACT

An information processing device includes an acquisition unit which acquires information of acceleration, angular velocity, and magnetic intensity of an operation device, a coordinate conversion unit which converts the angular velocity acquired by the acquisition unit into global angular velocity in a global coordinate system using information of posture angles of the operation device, an initial posture angle calculation unit which calculates a posture angle of the operation device in the initial stage in the global coordinate system based on the information of the acceleration and the magnetic intensity, an updating unit which updates the posture angle of the operation device in the global coordinate system based on information of the global angular velocity, and a control unit which causes the coordinate conversion unit to convert the first angular velocity into the global angular velocity and to convert a second angular velocity into the global angular velocity.

6 Claims, 9 Drawing Sheets

FIG. 1
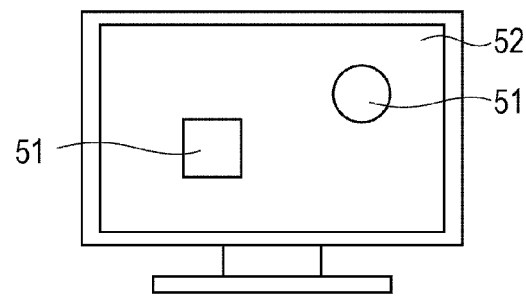
FIG. 2
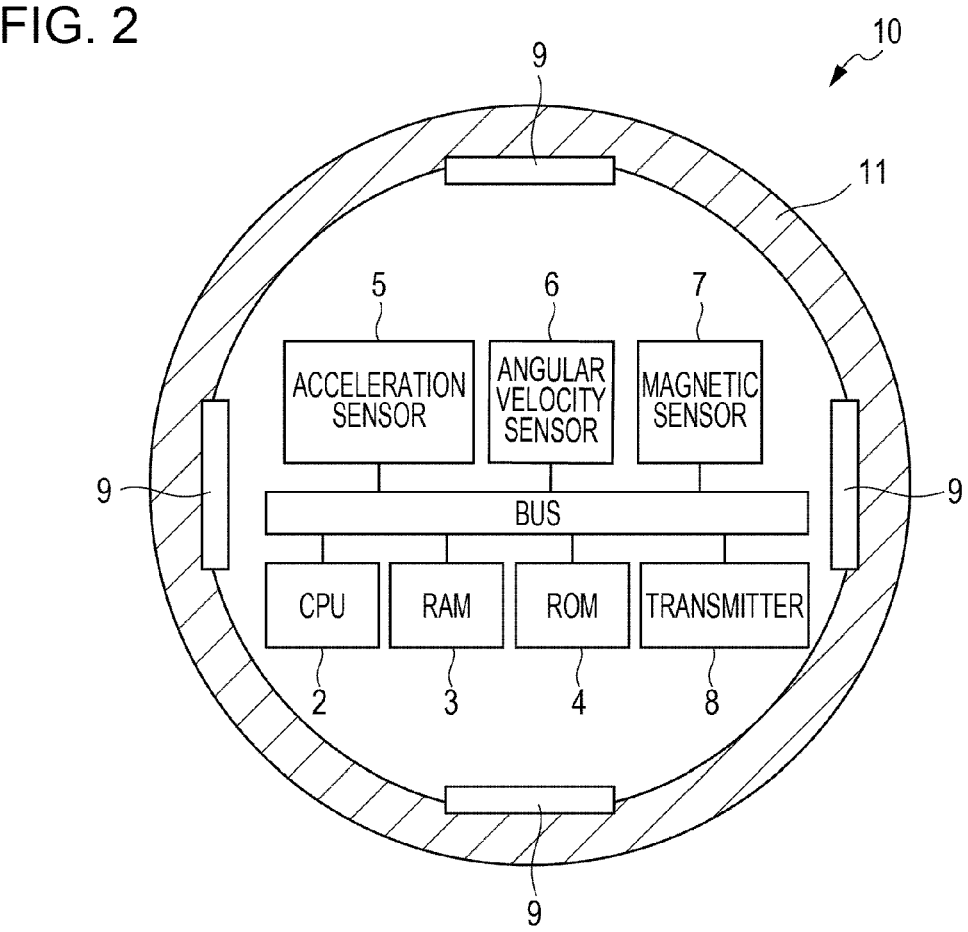

INFORMATION PROCESSING DEVICE, INFORMATION PROCESSING SYSTEM AND INFORMATION PROCESSING METHOD

BACKGROUND

The present disclosure relates to an information processing device, an information processing system, and an information processing method which are used to execute calculation for realizing motions of an operation target according to motions of an operation device that includes an acceleration sensor, and the like, based on information obtained from the acceleration sensor, and the like, when a user operates the operation device in a three-dimensional space.

In recent years, various kinds of space operation type operation devices or input devices have been proposed. For example, an input device described in Japanese Unexamined Patent Application Publication (Translation of PCT Application) No. 6-501119 detects six-dimensional motions of a mouse in a three-dimensional space. Specifically, the input device includes an accelerometer which detects acceleration in orthogonal three axes, and a rotation speed sensor which detects rotation speed in the vicinity of the orthogonal three axes. A system including the input device determines a position, a posture, and the like of its own based on obtained accelerations and rotation speeds, and a computer such as a display device enables a GUI (Graphical User Interface) to realize motions according to the motions of the input device (for example, refer to Japanese Unexamined Patent Application Publication (Translation of PCT Application) No. 6-501119).

SUMMARY

When a user operates the operation target using the operation device such as the input device, or the like described in Japanese Unexamined Patent Application Publication (Translation of PCT Application) No. 6-501119, however, it is necessary to hold the operation device so that the detection axis of the sensor included in the operation device coincides with the axis of the operation target. This means that it is necessary for the user to turn the operation device toward a predetermined direction while checking a part held in his or her hand when the user starts an operation of holding the operation device, or when the user corrects an error (an error between motions of the operation device and motions of the operation target, or the like).

As such, when the user frequently turns the eyes or the user frequently pays attention to the holding part, such as checking his or her own position holding the operation device, it is easy for the user to have autonomic dystonia such as fatigue, motion sickness, or the like.

Thus, it is desired to realize an operation device that makes the operation target be operable even when the user orients toward an arbitrary direction, or holds the operation device in an arbitrary holding way, in other words, even when the operation device is held in an arbitrary posture in a three-dimensional space. In order to realize such an operation device, it is necessary to recognize the relationship between the detection axis of a sensor and the axis of the operation target (in other words, the posture of the operation device in a three-dimensional space) not by consciousness of the user, but by the operation device or a system including the device.

In addition, particularly when an operation device provided with an acceleration sensor is operated and moved, both gravity acceleration and movement acceleration are detected by the acceleration sensor, and therefore, research has to be conducted for calculation for recognition of the posture of the operation device.

It is desirable to provide an information processing device, an information processing system, and an information processing method which enables an operation by an operation device by recognizing the posture of the operation device while suppressing occurrence of a calculation error even when the posture of the operation device held by a user is any posture in a three-dimensional space.

An information processing device according to an embodiment of the disclosure is equipped with an acquisition unit, a coordinate conversion unit, an initial posture angle calculation unit, an updating unit, and a control unit.

The operation device includes an acceleration sensor having an orthogonal three-axis detection axis, an angular velocity sensor having the orthogonal three-axis detection axis, and a magnetic sensor having the orthogonal three-axis detection axis in a local coordinate system, and can be operated in an arbitrary posture by a user in a three-dimensional space.

The acquisition unit acquires information of acceleration, angular velocity, and magnetic intensity of an operation device which are detected by each of the acceleration sensor, the angular velocity sensor, and the magnetic sensor thereof.

The coordinate conversion unit converts the angular velocity acquired by the acquisition unit into a global angular velocity in a global coordinate system which indicates the three-dimensional space based on information of posture angles of the operation device in the global coordinate system.

The initial posture angle calculation unit calculates a posture angle of the operation device in the initial stage in the global coordinate system out of the posture angles based on the information of the acceleration and the magnetic intensity acquired by the acquisition unit at the start of an operation of the operation device by the user.

The updating unit updates the posture angle of the operation device in the global coordinate system based on information of the global angular velocity converted by the coordinate conversion unit.

The control unit causes the coordinate conversion unit to convert the first angular velocity acquired by the acquisition unit at the start of the operation into the global angular velocity using information of the initial posture angle calculated by the angle calculation unit and to convert a second angular velocity acquired after the acquisition of the first angular velocity into the global angular velocity using information of the updated posture angle.

According to the embodiment of the disclosure, posture angles including the initial posture angle of the operation device in the global coordinate system are calculated based on information of acceleration, angular velocity, and magnetic intensity of the orthogonal three axes. Thus, the user can operate an operation target using the operation device in an arbitrary posture in the three-dimensional space.

In addition, when the operation is started by the user, the first angular velocity is converted by the coordinate conversion unit using information of the initial posture angle calculated based on information including the acceleration obtained by the acceleration sensor. In other words, in the moment of starting the operation, the acceleration sensor detects only gravity acceleration in practice, the initial posture angle is calculated based on information including the gravity acceleration by the initial posture angle calculation unit, and the coordinate conversion unit uses the calculated information.

However, during the operation by the user thereafter, the acceleration sensor detects a value obtained by adding movement acceleration (inertia acceleration) to the gravity acceleration. Thus, if a posture angle is calculated based on acceleration including such movement acceleration obtained by the acceleration sensor during the operation by the user, a serious error occurs.

Therefore, a coordinate conversion process is executed for the second angular velocity acquired after the first angular velocity acquired as the initial value based on information not including the information of the movement acceleration, that is, based on information of a posture angle updated at least once.

Accordingly, it is possible to suppress the circumstance in which the influence caused by the movement acceleration generated during the operation of the operation device by the user is exerted during calculation of a posture angle of the operation device and thereby causing an error in the calculation.

The coordinate conversion unit may convert the acceleration acquired by the acquisition unit into global acceleration in the global coordinate system based on information of a posture angle of the operation device updated by the updating unit. Since the information of the updated posture angle by the updating unit does not include the information of the movement acceleration as described above, it is possible to reflect motions of the operation device on the operation target by converting the acceleration into the global acceleration based on the information of the posture angle.

The information processing device may further include a determination unit which determines that an operation of the operation device has been started by the user using information of at least one of the acceleration, the angular velocity and the magnetic intensity acquired by the acquisition unit. Accordingly, since the time of starting the operation of the operation device is regulated, an output time point of an initial posture angle of the operation device can be tightly regulated.

The operation target of the operation device may be a three-dimensional image displayed on the screen of a display device which is electrically connected to the information processing device.

An information processing system according to another embodiment of the disclosure includes an operation device and a control device, the operation device includes an acceleration sensor having an orthogonal three-axis detection axis, an angular velocity sensor having the orthogonal three-axis detection axis, a magnetic sensor having the orthogonal three-axis detection axis in a local coordinate system, and a transmission unit transmitting information of acceleration, angular velocity, and magnetic intensity detected by each of the acceleration sensor, the angular velocity sensor, and the magnetic sensor, and can be operated in an arbitrary posture by a user in a three-dimensional space, and the control device includes a reception unit which receives the information transmitted from the operation device, and a coordinate conversion unit, an initial posture angle calculation unit, an updating unit, and a control unit as described above.

An information processing method according to still another embodiment includes acquiring information of acceleration, angular velocity, and magnetic intensity of an operation device, which includes an acceleration sensor having an orthogonal three-axis detection axis, an angular velocity sensor having the orthogonal three-axis detection axis, and a magnetic sensor having the orthogonal three-axis detection axis in a local coordinate system and can be operated in an arbitrary posture by a user in a three-dimensional space, which are detected by each of the acceleration sensor, the angular velocity sensor, and the magnetic sensor, calculating a posture angle of the initial stage out of posture angles of the operation device in a global coordinate system indicating the three-dimensional space based on information of the acceleration and the magnetic intensity acquired at the start of an operation of the operation device by the user, converting a first angular velocity acquired at the start of the operation into global angular velocity in the global coordinate system using the calculated posture angle of the initial stage, calculating a new posture angle instead of the posture angle of the initial stage based on information of the converted global angular velocity, and converting a second angular velocity acquired after the acquisition of the first angular velocity into the global angular velocity using information of the calculated new posture angle.

According to the embodiments of the disclosure, even if the operation device held by the user takes any posture in the three-dimensional space, the posture of the operation device can be recognized while suppressing the occurrence of a calculation error, whereby an operation by the operation device is possible.

BRIEF DESCRIPTION OF THE DRAWINGS

FIG. 1 is a diagram showing an information processing system according to an embodiment of the present disclosure;

FIG. 2 is a diagram showing a configuration of hardware of an operation device according to an embodiment of the disclosure;

DETAILED DESCRIPTION OF EMBODIMENTS

Figure 3:
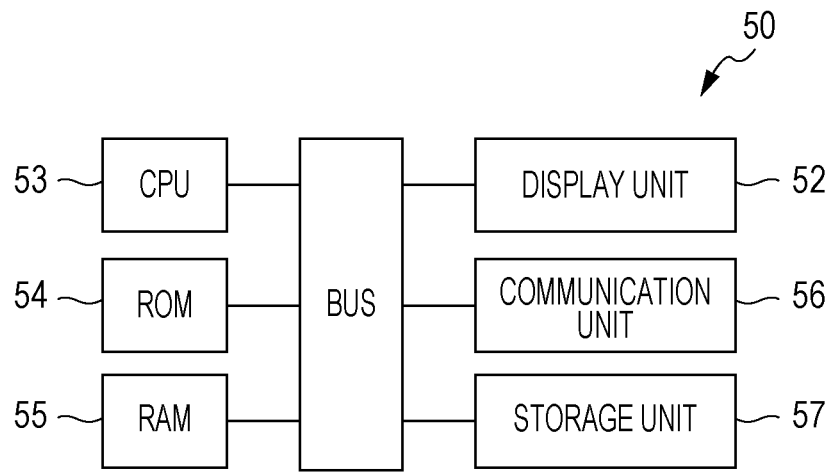
FIG. 3 is a diagram showing a configuration of hardware of a display device according to an embodiment of the disclosure.

Hereinafter, an embodiment of the present disclosure will be described with reference to drawings.

[Configuration of Information Processing System]

FIG. 1 is a diagram showing an information processing system according to an embodiment of the disclosure.

The information processing system includes an operation device 10 which is operated by a user, and a display device 50 which receives operation information transmitted from the operation device 10 to execute a display process based on the information. The operation device 10 and the display device 50 are electrically connected to each other, and in the embodiment, the units are connected so that wireless communication is performed through infrared rays, radio waves, or the like.

The operation device 10 is formed in a hand-held size, and formed in, for example, a spherical shape. The display device 50 functions as a control device executing control of display such as rotating or moving an object (operation target) 51 in the screen of a display unit 52 with operation of a user using the operation device 10.

As a typical example of the display device 50, there is, for example, a 3D (dimension) TV, or the like, which can display the 3D object 51. The operation target is not limited to 3D images, but may be 2D images such as icons, pointers, and the like. Alternatively, the icons and pointers may be displayed as 3D images.

FIG. 2 is a diagram showing a configuration of hardware of the operation device 10 according to an embodiment of the disclosure. The operation device 10 includes an acceleration sensor 5, an angular velocity sensor 6, a magnetic sensor 7, a CPU 2, a RAM 3, a RAM 4, and a transmitter 8. In addition, the operation device 10 includes a power source not shown in the drawing, a pressure sensor 9, a rewritable memory, and the like. Instead of the CPU 2, programmable hardware, for example, an FPGA (Field Programmable Gate Array), or the like may be used. As the angular velocity sensor 6, a device is used, which detects an angular velocity using, for example, a Coriolis force.

The hardware is arranged in a housing 11 of a spherical shape so as to be fixed to the housing 11. The pressure sensor 9 is installed in plural in, for example, the inner side of the housing 11, and the pressure sensor group detects a pressured position by a user and the pressure therein.

FIG. 3 is a diagram showing a configuration of hardware of the display device 50 according to an embodiment of the disclosure. The display device 50 includes a CPU 53, a ROM 54, and a RAM 55 as in general computers, and also includes a display unit 52, a communication unit 56, and a storage unit 57. The communication unit 56 mainly functions as a receiver here. The storage unit 57 is a typical auxiliary (secondary) storage unit of the ROM 54 and the RAM 55.

Furthermore, the display device 50 has a configuration in which a control part (control device) which receives information transmitted from the operation device 10 and controls the display of the object 51 is integrated with the display unit 52, but the control part and the display unit may be connected to each other as separate units so as to perform communication in a wire or wireless manner.

Figure 4:
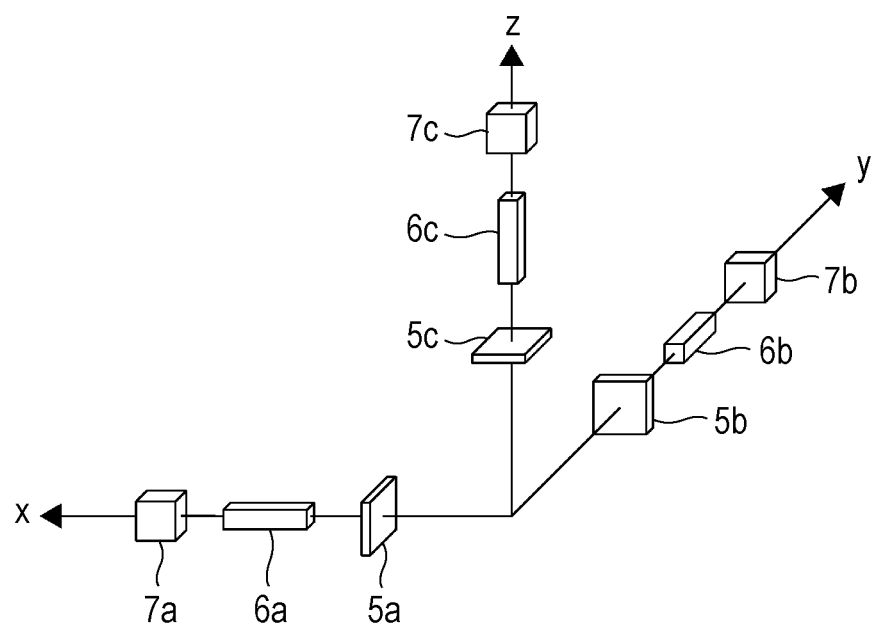
FIG. 4 is diagram for illustrating detection axes of each sensor of the operation device and a relative arrangement thereof.

FIG. 4 is diagram for illustrating detection axes of each sensor of the operation device 10 and a relative arrangement thereof. All of the acceleration sensor 5, the angular velocity sensor 6, and the magnetic sensor 7 have orthogonal three-axis detection axes, respectively. In other words, the acceleration sensor 5 has sensors (5a, 5b, and 5c) corresponding to three detection axes. The angular velocity sensor 6 and the magnetic sensor 7 also have sensors (6a, 6b, and 6c), and (7a, 7b, and 7c), respectively.

For example, all the sensors 5, 6, and 7 are packaged in single shared package. Alternatively, the sensors 5, 6, and 7 are packaged in separate packages and mounted on single shared sensor substrate.

Figure 6:
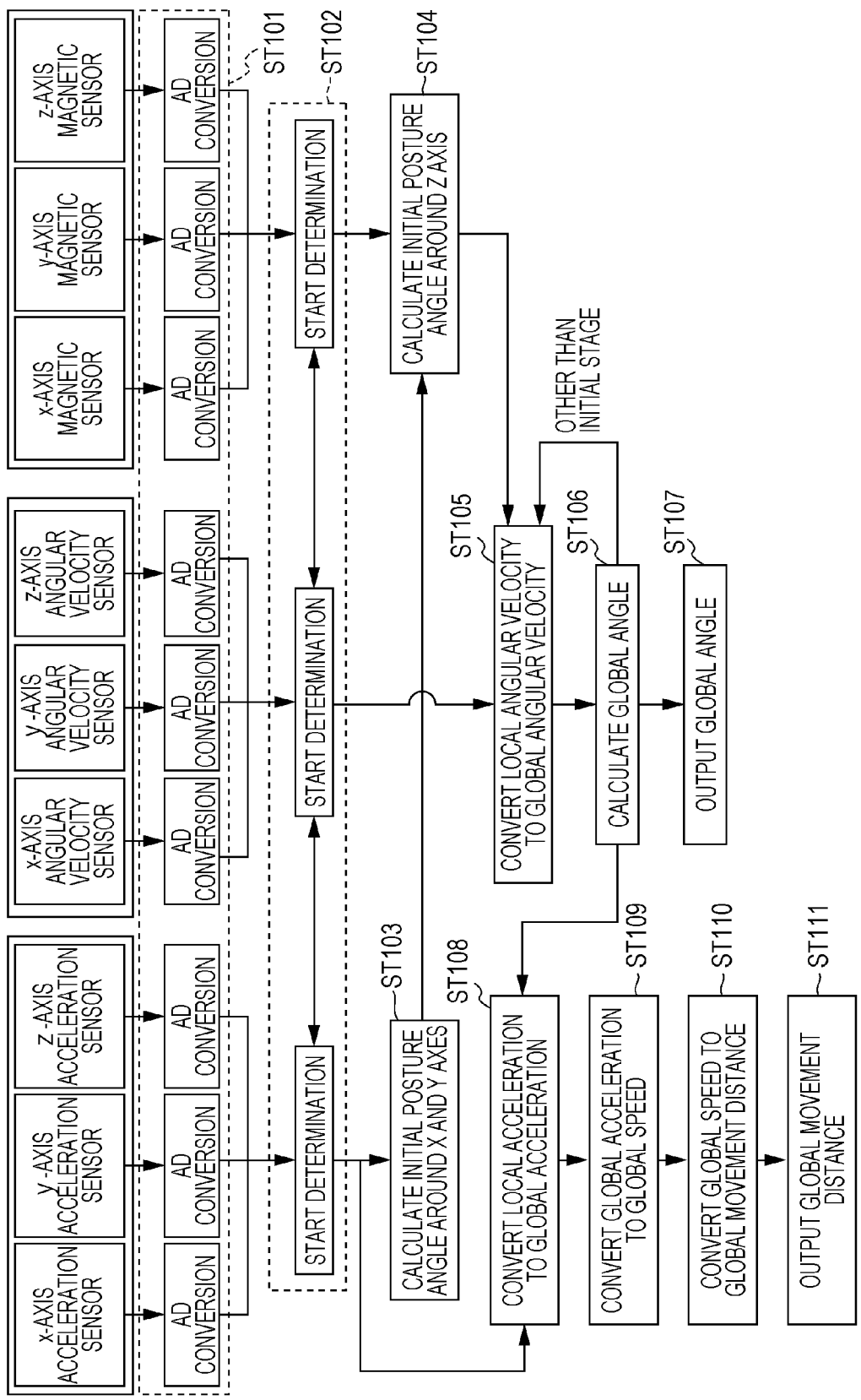
FIG. 6 is a flowchart showing a process of the operation device.

The ROM 4, a memory, which is not shown in the drawing, of the operation device 10, and/or the ROM 54 and the storage unit 57 of the display device 50 store software, or the like, for realizing a process shown in FIG. 6 to be described later. The process shown in FIG. 6 is a process for recognizing the posture of the operation device 10. In an embodiment to be described below, the CPU 2 and the above-described software mainly function as control units.

Figure 5:
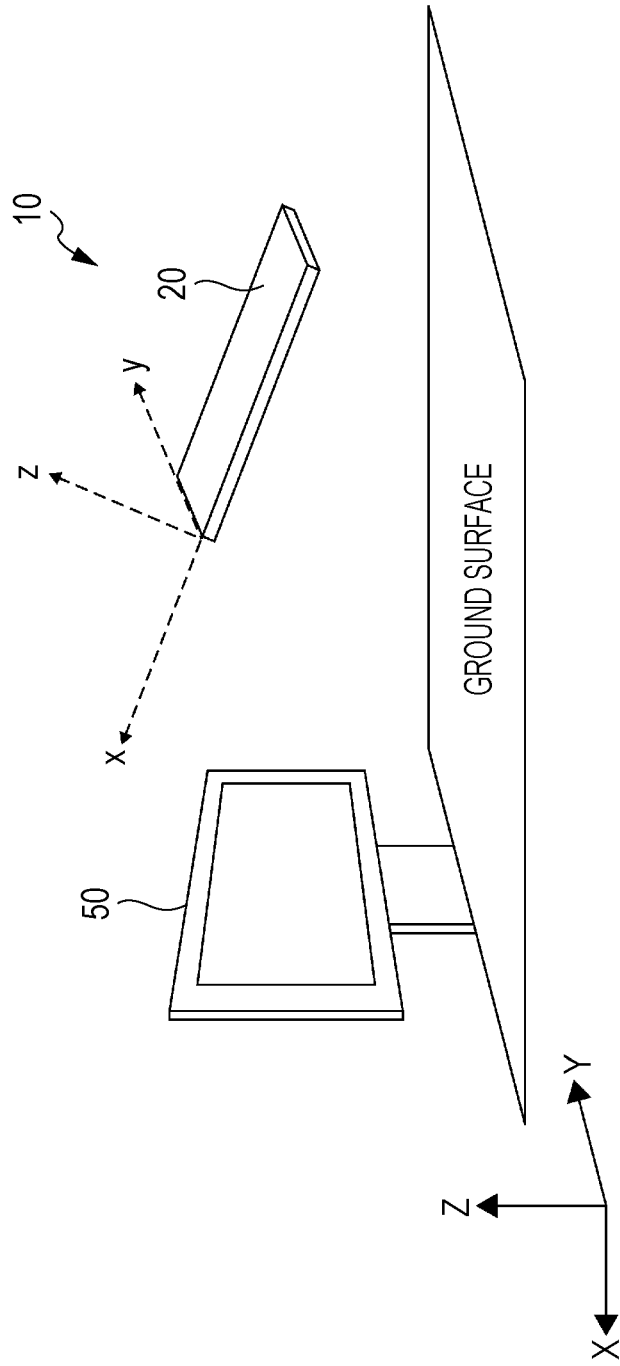
FIG. 5 is a diagram showing the relationship between a local coordinate system and a global coordinate system.

FIG. 5 is a diagram showing the relationship between a local coordinate system and a global coordinate system.

The display device 50 is put on the ground surface. Herein, a coordinate system which is fixed to the ground surface or the display device 50 is called a global coordinate system. In addition, a coordinate system which is fixed to the sensor substrate 20 of the operation device 10 including the coordinate that can freely move with respect to the global coordinate system is called a local coordinate system. The sensor substrate 20 is a shared substrate on which the acceleration sensor 5, the angular velocity sensor 6, and the magnetic sensor 7 are mounted as described above.

For convenience of description, hereinafter, the global coordinate system is indicated by large letters (X, Y, and Z), and the local coordinate system is indicated by small letters (x, y, and z). However, in order to facilitate understating of sentences, description will be provided using the expressions "local" and "global" as far as possible. The ground surface is set to an X-Y plane in the global coordinate system, and a surface parallel to the main surface of the substrate is set to an x-y plane in the local coordinate system.

[Process Content of Operation Device]

FIG. 6 is a flowchart showing a process of the operation device.

A signal output from each of the sensors 5 (5a, 5b, and 5c), 6 (6a, 6b, and 6c), and 7 (7a, 7b, and 7c) is converted to digital information by an AD converter (Step ST101). In this case, the CPU 2 mainly functions as an acquisition unit which acquires information of acceleration, angular velocity, and magnetic intensity. Information acquired by the acquisition unit is first used in a process of start determination (Step ST102). The start determination is determination of whether or not a user is holding the operation device and started an operation.

The start determination process is executed using information obtained from, for example, at least one of the acceleration sensor 5, the angular velocity sensor 6, and the magnetic sensor 7. In FIG. 6, the start determination process is executed using information obtained from, for example, all of the sensors 5, 6 and 7, but a start determination process using Formulas 1 and 2 below uses only the acceleration sensor 5. When the start determination process is executed, for example, the CPU 5 and software in which the calculation content is described function as determination units.

$$\sqrt{a_x^2 + a_y^2 + a_z^2} = \text{Constant} \qquad \text{Formula 1}$$

$$B < \sqrt{a_x^2 + a_y^2 + a_z^2} < C \qquad \text{Formula 2}$$

$a_x$, $a_y$, $a_z$: acceleration of three axes (local acceleration) detected by the acceleration sensor (5a, 5b, and 5c)

B, C: constant

The "constant" of Formula 1 is set to, for example, a value close to zero. When Formula 1 is not valid, it means that movement acceleration is added to the acceleration sensor 5 in addition to gravity acceleration, and it is determined that the operation device has been moved. In Formula 2, when the detected acceleration is out of a predetermined range, it is determined that the operation device has been moved.

Processes after Step ST103 are processes executed when it is determined that an operation has started.

Figure 7:
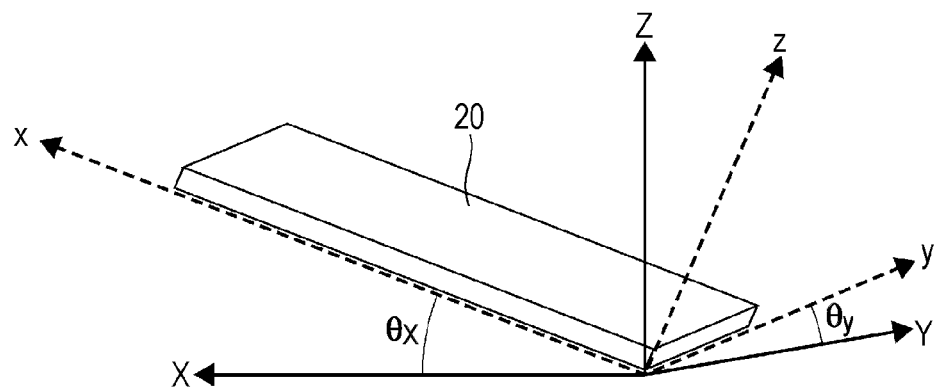
FIG. 7 is a diagram for illustrating the principle of the calculation process shown in FIG. 6 and showing the state where the inclination (posture) of a sensor substrate is inclined in the global coordinate system.

When an operation by the operation device 10 has started, in Step ST103, initial posture angles around global X and Y axes of the operation device 10 are calculated respectively based on information of acceleration (particularly, acceleration ($a_x$, $a_y$) in the x and y axis directions) detected by the acceleration sensor 5. FIG. 7 is a diagram for illustrating the principle of the calculation process and showing the state where the inclination (posture) of the sensor substrate 20 is inclined in the global coordinate system.

Figure 8:
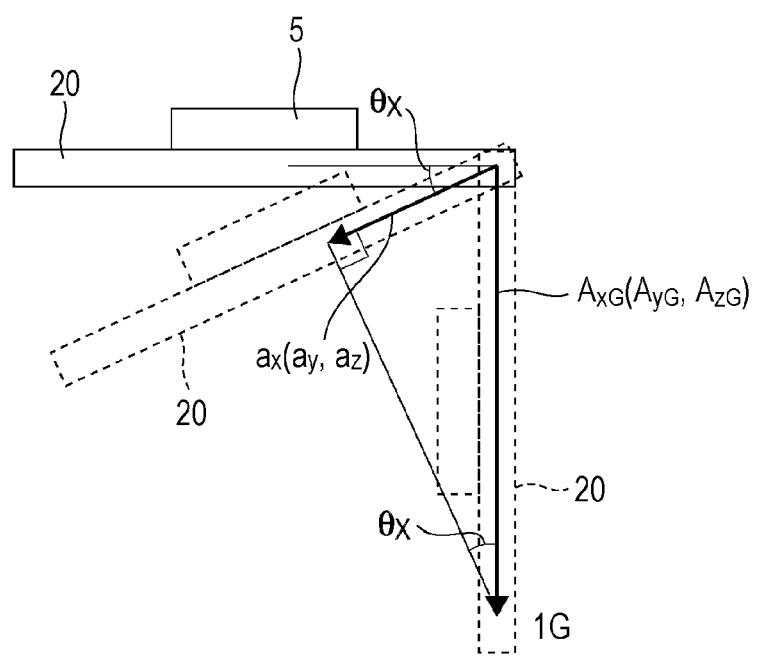
FIG. 8 is a diagram for illustrating the principle of the calculation process shown in FIG. 6 as in FIG. 7.

When the initial posture angle around, for example, the global Y axis, that is an angle $\theta_x$ from the X axis is to be calculated, the calculation is performed with Formula 3 below based on the information of the acceleration $a_x$. In Formula 3, as shown in FIG. 8, a value of gravity 1G detected by the acceleration sensor 5a of the x axis is set to, for example, $A_{xG}$, a value of the acceleration sensor 5a is set to $a_x$ in a state where the sensor substrate 20 is inclined (a state where the acceleration sensor 5 (5a) is inclined).

In the same manner, the initial posture angle around the global X axis, that is, an angle $\theta_y$ from the Y axis is calculated with Formula 4 based on the information of the acceleration $a_y$. A value of the acceleration sensor 5b of the y axis for gravity 1G is set to $A_{yG}$.

$\theta_x = -a\sin(a_x/A_{xG})$ when $a_x<0$ and $a_z>0$ $\theta_x = 180 + a\sin(a_x/A_{xG})$ when $a_x<0$ and $a_z<0$ $\theta_x = 180 + a\sin(a_x/A_{xG})$ when $a_x>0$ and $a_z<0$ $\theta_x = 360 + a\sin(a_x/A_{xG})$ when $a_x>0$ and $a_z>0$  Formula 3

$\theta_y = -a\sin(a_y/A_{yG})$ when $a_y<0$ and $a_z>0$ $\theta_y = 180 + a\sin(a_y/A_{yG})$ when $a_y<0$ and $a_z<0$ $\theta_y = 180 + a\sin(a_y/A_{yG})$ when $a_y>0$ and $a_z<0$ $\theta_y = 360 + a\sin(a_y/A_{yG})$ when $a_y>0$ and $a_z>0$  Formula 4

$A_{xG}$, $A_{yG}$: gravity acceleration 1G detected by each of the acceleration sensors 5a and 5b of the x and y axes $a_x$, $a_y$, $a_z$: the current value detected by each of the acceleration sensors 5a, 5b, and 5c of the x, y, and z axes (local acceleration)

$\theta_x$, $\theta_y$: initial posture angle from the X and Y axes of the sensor substrate in the global coordinate system Furthermore, a sine is used in Formulas 3 and 4, but the initial posture angle can be calculated also with a cosine or other calculation methods.

Next, in Step ST104, the initial posture angle (azimuth) around the global Z axis of the operation device 10 is calculated based on information calculated in Step ST103 and information of magnetic intensities detected by the magnetic sensor 7 in each axis direction in the local coordinate system.

For the calculation, Formula 5 below is used. In Formula 5, magnetic intensities (local magnetic intensities) detected by each of the magnetic sensors 7a, 7b, and 7c of the x, y, and z axes are set to $h_x$, $h_y$, and $h_z$. In addition, magnetic intensities (global magnetic intensities) of the global X, Y, and Z axis directions obtained from the calculation are set to $H_x$, $H_y$, and $H_z$.

$H_x = h_x \cos\theta_y + h_y \sin\theta_x \sin\theta_y - h_z \cos\theta_x \sin\theta_y$ $H_y = h_y \cos\theta_x + h_z \sin\theta_x$ $\theta_z$ (azimuth) = $\arctan(H_y/H_x)$  Formula 5

$h_x$, $h_y$, $h_z$: magnetic intensity of the x, y, and z axis directions in the local coordinate system (local magnetic intensity)

$H_x$, $H_y$: magnetic intensity of the global X and Y axis directions (global magnetic intensity)

$\theta_z$: initial posture angle around the global Z axis (azimuth)

The operation device 10 can recognize the azimuth of the sensor substrate 20 around the global Z axis by using the magnetic sensor 7 which detects geomagnetism as above. When Formulas 3 to 5 are calculated, the CPU 2 and software in which the calculation content is described function as initial posture angle calculation units.

As above, the operation device 10 can recognize the initial posture (inclination for the X, Y, and Z axes) of the sensor substrate 20 in the global coordinate system with the calculation process of Steps ST103 and ST104. In other words, the operation device 10 can recognize its own posture without being conscious of the way and the direction of holding the operation device 10 by the user. As a result, the user can start an operation using the operation device which takes an arbitrary posture in a three-dimensional space.

Next, in Step ST105, angular velocity detected by the angular velocity sensor 6 at the operation start, in other words, immediately after the operation start, is converted into a global angular velocity in the global coordinate system based on information of the initial posture angles ($\theta_x$, $\theta_y$, and $\theta_z$) calculated in Steps ST103 and ST104. In other words, this is rotational coordinate conversion. The calculation process uses Formula 6. In this case, the CPU 2 and software in which the calculation content is described function as coordinate conversion units.

$$\begin{pmatrix} W_x \\ W_y \\ W_z \end{pmatrix} = \begin{pmatrix} 1 & 0 & 0 \\ 0 & \cos\theta_x & \sin\theta_x \\ 0 & -\sin\theta_x & \cos\theta_x \end{pmatrix}$$

$$\begin{pmatrix} \cos\theta_y & 0 & -\sin\theta_y \\ 0 & 1 & 0 \\ \sin\theta_y & 0 & \cos\theta_y \end{pmatrix} \begin{pmatrix} \cos\theta_z & \sin\theta_z & 0 \\ -\sin\theta_z & \cos\theta_z & 0 \\ 0 & 0 & 1 \end{pmatrix} \begin{pmatrix} w_x \\ w_y \\ w_z \end{pmatrix}$$

Formula 6

$w_x$, $w_y$, $w_z$: angular velocity around the local x, y, and z axes (local angular velocity)

$W_x$, $W_y$, $W_z$: angular velocity around the global X, Y, and Z axes (global angular velocity)

In Step ST106, an angle $R_x$ around the global X axis is calculated using the global angular velocity calculated as above. In other words, a global angle (of the X axis direction component) is calculated. The calculation process uses Formula 7. The calculation process uses trapezoidal integration. Angles $R_y$ and $R_z$ around the global Y and Z axes are also calculated in the same manner as R. The meaning of the process of Step ST106 is to change the initial posture angles ($\theta_x$, $\theta_y$, and $\theta_z$) to new posture angles ($R_x$, $R_y$, and $R_z$), that is, to update the posture angles. In this case, the CPU 2 and the software in which the calculation content is described function as updating units.

$$R_x(t_n) = \frac{(W_x(t_{n-1}) + W_x(t_n)) \times \Delta t}{2}$$  Formula 7

$R_x$: an angle around the X axis in the global coordinate system (global angle (global posture angle))

($t_n$): a value obtained in n-th order $\Delta t = t_n - t_{n-1}$

If the global angle is calculated as above, the information is transmitted (output) to the display device 50 by the transmitter 8 (Step ST107). In the current point, the global angle is a global angle at the initial time (that is, of the operation start time). The display device 50 can receive the information and display the object 51 setting the initial global angle as a posture angle at the start of motions of the object 51. If the display device 50 receives information of the global angle for the second time and thereafter, the display device 50 displays the object 51 taking a posture according to the global angle on the display unit 52.

Furthermore, the global angle can be obtained by various integration processes such as the midpoint rule or the Simpson's rule, not being limited to the trapezoidal integration as in Formula 7.

Herein, in the initial stage, the coordinate conversion units executes the coordinate conversion process for the local angular velocity (initial value) based on the information of the initial posture angles ($\theta_x$, $\theta_y$, and $\theta_z$) in Step ST105. However, the coordinate conversion units execute the coordinate conversion process for the local angular velocity (value of the second time and thereafter) based on the information of the global angles ($R_x$, $R_y$, and $R_z$) calculated in Step ST106 in the process of Step ST105 of the second time and thereafter (other than the initial stage). The calculation process uses Formula 8 below.

$$\begin{pmatrix} W_x \\ W_y \\ W_z \end{pmatrix} = \begin{pmatrix} 1 & 0 & 0 \\ 0 & \cos R'_x & \sin R'_x \\ 0 & -\sin R'_x & \cos R'_x \end{pmatrix}$$
$$\begin{pmatrix} \cos R'_y & 0 & -\sin R'_y \\ 0 & 1 & 0 \\ \sin R'_y & 0 & \cos R'_y \end{pmatrix} \begin{pmatrix} \cos R'_z & \sin R'_z & 0 \\ -\sin R'_z & \cos R'_z & 0 \\ 0 & 0 & 1 \end{pmatrix} \begin{pmatrix} w_x \\ w_y \\ w_z \end{pmatrix}$$

Formula 8

The global angles of the operation device 10 gradually changes (every second). Therefore, specifically in Formula 8, the rotational coordinate conversion is performed based on a value sequentially with the global angles added as shown in formulas below.

$$R_x' = R_x(t_n) + R_x(t_{n+1})$$

$$R_y' = R_y(t_n) + R_y(t_{n+1})$$

$$R_z' = R_z(t_n) + R_z(t_{n+1})$$

However, depending on the specification of software for displaying images by the display device 50, ($R_x$, $R_y$, and $R_z$) may be used instead of ($R_x'$, $R_y'$, and $R_z'$) in Formula 8 (the same as in Formula 9 below).

The information of the global angles ($R_x$, $R_y$, and $R_z$) calculated in Step ST106 is also used in the process of Step ST108. In Step ST108, the coordinate conversion units convert local acceleration into global acceleration using the information of the global angles in the same manner as in Formula 8. The calculation process uses Formula 9 below.

$$\begin{pmatrix} A_x \\ A_y \\ A_z \end{pmatrix} = \begin{pmatrix} 1 & 0 & 0 \\ 0 & \cos R'_x & \sin R'_x \\ 0 & -\sin R'_x & \cos R'_x \end{pmatrix}$$
$$\begin{pmatrix} \cos R'_y & 0 & -\sin R'_y \\ 0 & 1 & 0 \\ \sin R'_y & 0 & \cos R'_y \end{pmatrix} \begin{pmatrix} \cos R'_z & \sin R'_z & 0 \\ -\sin R'_z & \cos R'_z & 0 \\ 0 & 0 & 1 \end{pmatrix} \begin{pmatrix} a_x \\ a_y \\ a_z \end{pmatrix}$$

Formula 9

$A_x$, $A_y$, $A_z$: acceleration around the global X, Y, and Z (global acceleration)

The coordinate conversion units execute coordinate conversion based on the information of global angles in stages other than the initial stage also in Step ST108 as above.

As above, if the initial posture angles are calculated for the first time, the global angles calculated in Step ST106 are used in calculations of the second time and thereafter without using the initial posture angles. Hereinbelow, the reason will be described.

At the start of the operation of the operation device 10 by the user, local angular velocity is converted into global angular velocity using the information of initial posture angles calculated based on information including acceleration obtained by the acceleration sensor 5. In other words, at the moment of starting the operation, the acceleration sensor 5 detects only gravity acceleration practically; initial posture angles are calculated based on information including the gravity acceleration, and coordinate conversion is performed based on the initial posture angles.

However, during the operation by the user thereafter, the acceleration sensor 5 detects a value obtained by adding movement acceleration (inertia acceleration) to the gravity acceleration. In other words, during the operation by the user, the posture of the sensor substrate 20 changes every second. Thus, if a posture angle is calculated based on acceleration including such movement acceleration obtained by the acceleration sensor 5 during the operation of the user, a serious error occurs.

Therefore, in the present embodiment, a conversion process is executed for local angular velocity acquired after local angular velocity acquired as an initial value based on information not including information of movement acceleration, that is, information of a posture angle updated using local angular velocity, at least once (information obtained after passing through Steps ST105 and ST106 at least once). This is because a value of the local angular velocity is not affected by movement acceleration.

According to the calculation process, it is possible to suppress the circumstance in which the influence caused by movement acceleration generated during the operation of the operation device 10 by the user is exerted during calculation of a posture angle of the operation device 10 and thereby causing an error in the calculation.

Next, in Step ST109, velocity is calculated based on the global acceleration calculated in Step ST108, and in Step ST110, a movement distance is calculated from the velocity. The calculation process can be executed using various integration methods of the above-described Step ST106. In Step ST111, the operation device 10 transmits (outputs) the information of the calculated distance to the display device 50. The display device 50 receives the distance information, and displays the object 51, which moves as far as the distance, on the display unit 52.

As described above, since the information of the posture angle updated in Step ST106 does not include information of movement acceleration, it is possible to faithfully reproduce the motions of the operation device 10 as the motions of the object 51 by converting the local acceleration into the global acceleration based on the information of the posture angle. Accordingly, the user can perform the operation intuitively.

As described above, in the present embodiment, even if the operation device 10 held by the user takes any posture in a three-dimensional space, it is possible that the posture of the sensor substrate 20 is recognized while suppressing the occurrence of a calculation error, whereby the object 51 can be operated by the operation device 10.

In the above description, an embodiment in which the operation device 10 executes all the processes shown in FIG.

6 is introduced. However, a part of the processes shown in FIG. 6 may be executed by the display device 50. For example, the operation device 10 may execute the process up to Step ST101, and transmit information of acceleration, angular velocity, and magnetic intensity detected by each of the sensors 5, 6, and 7 to the display device 50. The display device 50 receives the information, and executes the processes of Step ST102 and thereafter. Alternatively, the operation device 10 may execute the processes, for example, up to Step ST102, . . . , or ST105, and the display device 50 may execute the remaining processes.

Of which process the operation device 10 and the display device 50 will take charge may be appropriately determined based on environmental components, for example, calculation process performance thereof, costs thereof, chip size thereof, and the like.

SPECIFIC DESCRIPTION OF APPLICATION EXAMPLE OF INFORMATION PROCESSING SYSTEM

Figure 9:
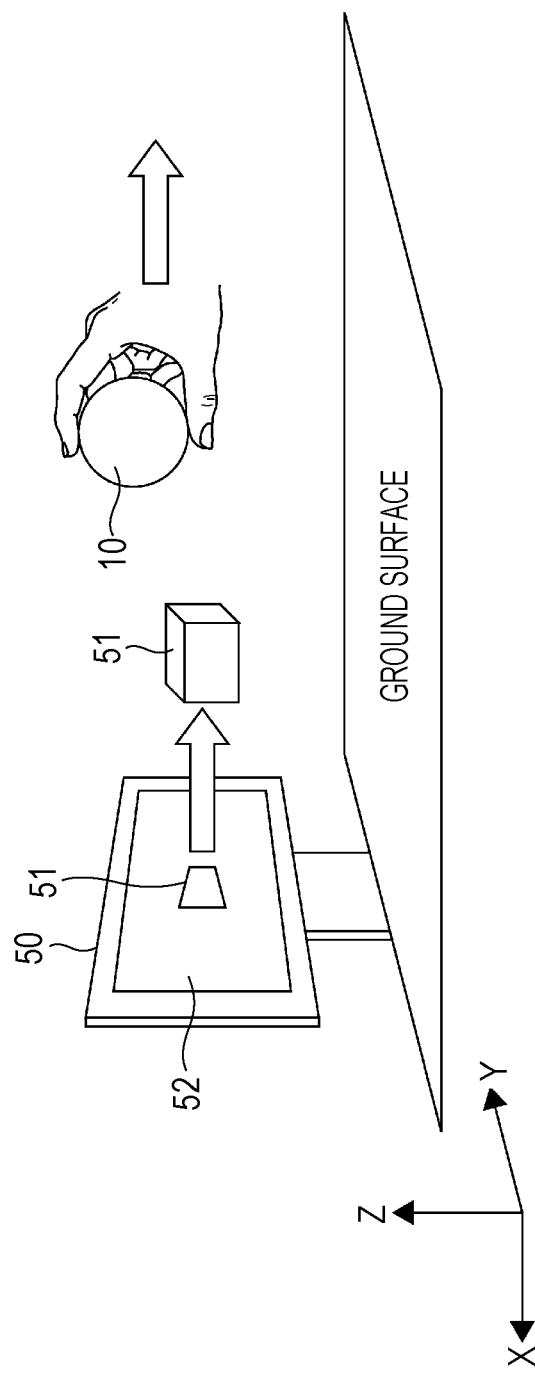
FIG. 9 is a diagram showing the appearance when a user actually operates an object using the operation device according to the embodiment of the disclosure.

FIG. 9 is a diagram showing the appearance when a user actually operates the object 51 using the operation device 10 according to the embodiment of the disclosure. This is the appearance in which the user draws the operation device 10 from the display unit 52 of a 3D TV as the display device 50 along the negative direction of the X axis of the global coordinate system. In this case, the display device 50 displays as if the object 51 moves to the front of the user according to the operation of the user by adjusting parallax. In the same manner, when the user pushes the operation device 10 along the positive direction of the X axis of the global coordinate system, the display device 50 displays as if the object 51 moves in the depth direction of the display unit 52.

Figure 10:
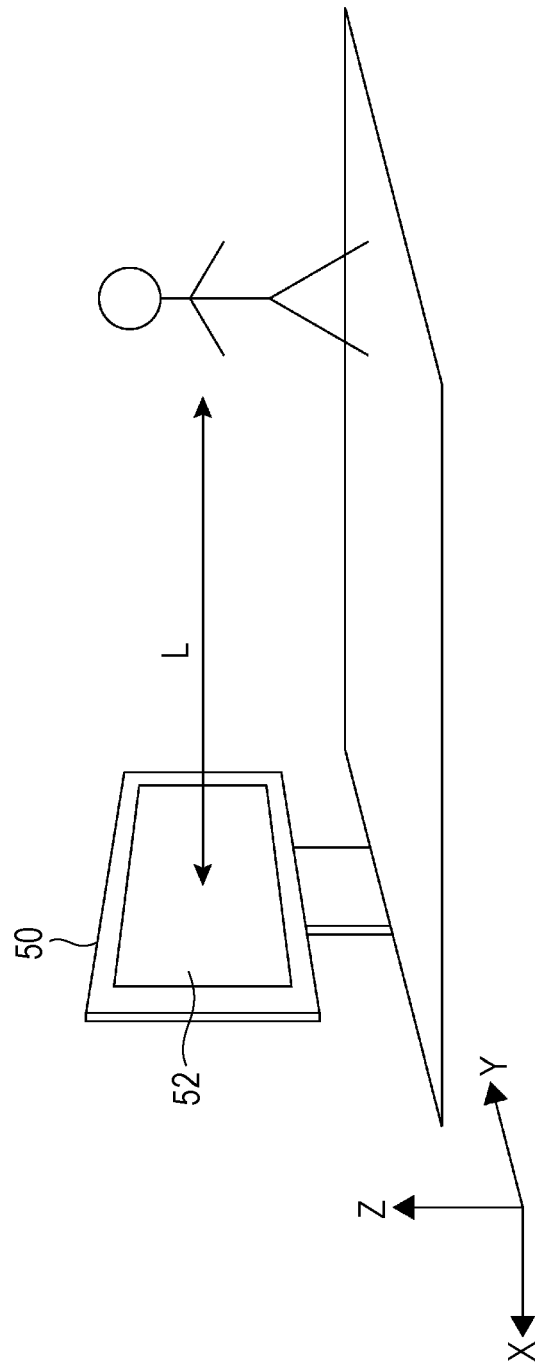
FIG. 10 is a diagram showing a distance between a display unit of a display device and (eyes) of a user.

The three-dimensional display on the global X axis as above is possible by associating the motions of the operation device 10 in the global coordinate with the parallax of video displayed on the display device 50. As shown in FIG. 10, the distance between the display unit 52 of the display device 50 and (eyes of) the user, that is, the viewing distance is set to L.

Figure 11:
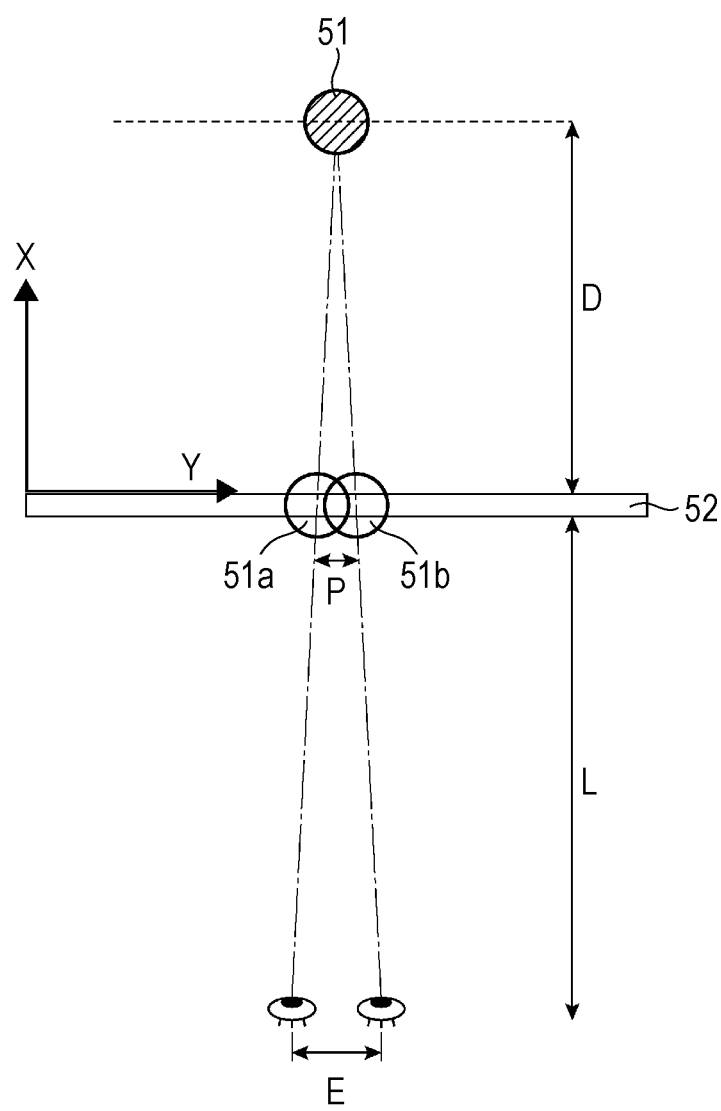
FIG. 11 is a diagram for illustrating a display principle of 3D video in a depth direction (X axis direction) and shows a state where an object is displayed inside a display unit.
Figure 12:
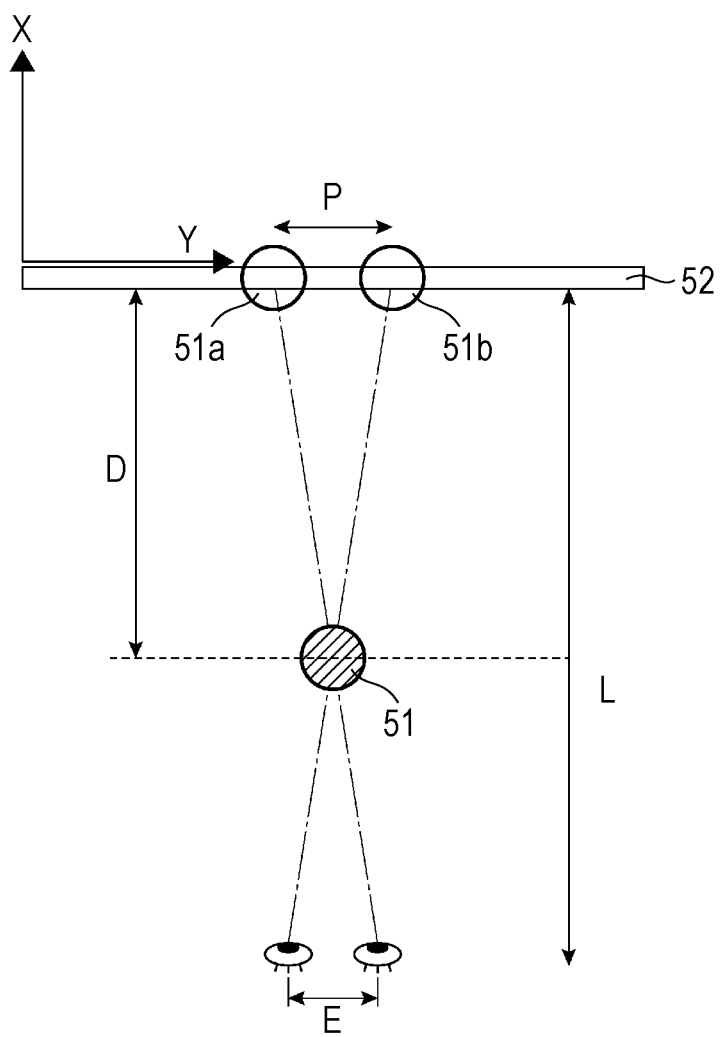
FIG. 12 is a diagram for illustrating a display principle of 3D video in a depth direction (X axis direction) and shows a state where an object is displayed in front of the display unit.

FIGS. 11 and 12 are diagrams for illustrating a display principle of 3D video in the depth direction (X axis direction). Referring to FIG. 11, if setting is performed as below:
L: viewing distance;
P: parallax of video;
E: distance between eyeballs; and
D: depth of the object, then, the following is valid, $$P=(D \times E)/(D+L) \text{ based on } D:P=(D+L):E.$$

For example, when E=65 mm, L=2 m, and the object 51 is viewed by the user so as to be displayed at the position of 24 m (D=24 m) of the depth to the display unit 52, P=6 cm. In other words, it is better to generate parallax images 51a and 51b which are deviated from each other by 6 cm, constituting the object 51.

The motions of the operation device 10 in the X axis direction of the global coordinate can be linked to 3D video by associating the parallax P and a movement distance T of the operation device 10 in the screen in the global coordinate system as P=αT (α is a proportional constant).

The relation shown in FIG. 12 takes the same point of view as in FIG. 11.

$$P=(D \times E)/(L-D) \text{ based on } D:P=(L-D):E$$

For example, when E=65 mm, L=2 m, and the object 51 is viewed by the user so as to be displayed at the position of 1.2 m (D=1.2 m) of the front from the display unit 52, P=10 cm. In other words, it is better to generate parallax images 51a and 51b which are deviated from each other by 10 cm, constituting the object 51.

The motions of the operation device 10 in the X axis direction of the global coordinate can be linked to 3D video by associating the parallax P and a movement distance T of the operation device 10 in the screen in the global coordinate system as P=αT (α is a proportional constant).

OTHER EMBODIMENT

An embodiment according to the disclosure is not limited to the embodiment described above, and realized in various forms of embodiments.

In the above-described embodiment, a value detected by each of the sensors for the first time after the start of an operation is determined at the start determination process of Step ST102 is described as a local value (local acceleration, local angular velocity, and local magnetic intensity). Any one of values detected by each of the sensors for a few predetermined times from the time point when the start of the operation is determined at the start determination process, or the average value, the intermediate value, or the like of the values may be set to a local value. In other words, the start of the operation is a notion including a predetermined time period after the operation is started, and a notion including a certain period to the extent that a user does not feel a sense of incompatibility with the first movement of the object. The predetermined period is also based on a clock frequency of CPUs in the operation device and the display device.

In the above-described embodiment, the operation device 10 and the display device 50 are wirelessly connected, but may be connected to each other in a wired manner. A communication medium between the devices may be the Internet.

In the above-described embodiment, the case is exemplified in which the operation device 10 and the display device 50 are in the same room, but for example, the devices may be located in separate buildings, or remote places. In that case, a communication medium between the devices may be the Internet as described above.

The operation target may be a robot or other machine in the actual world, not being limited to images displayed on a screen. In that case, a remote operation may be realized as above.

The operation device 10 described above has a spherical outer shape, but is not limited thereto, and can adopt various outer shapes.

The present disclosure contains subject matter related to that disclosed in Japanese Priority Patent Application JP 2010-278809 filed in the Japan Patent Office on Dec. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising: an acquisition unit configured to acquire information of acceleration, angular velocity, and magnetic intensity of an operation device, the operation device comprising an acceleration sensor having an orthogonal three-axis detection axis, an angular velocity sensor having the orthogonal three-axis detection axis, and a magnetic sensor having the orthogonal three-axis detection axis in a local coordinate system, the operation device being configured for operation in an arbitrary posture by a user in a three-dimensional space, the acquisition unit being configured to acquire acceleration information detected by the acceleration sensor, first angular velocity information detected by the angular velocity sensor, and magnetic intensity information detected by the magnetic sensor;
  a coordinate conversion unit configured to convert the angular velocity acquired by the acquisition unit into global angular velocity in a global coordinate system which indicates the three-dimensional space using information of posture angles of the operation device in the global coordinate system;
  an initial posture angle calculation unit configured to calculate a posture angle of the operation device in an initial stage in the global coordinate system out of the posture angles based at least in part on acceleration information and magnetic intensity information acquired by the acquisition unit at a start of an operation of the operation device by the user, the acceleration information consisting of gravitational acceleration information and not inertial acceleration information, the magnetic intensity information comprising magnetic intensities detected by the magnetic sensor in each of the three axis directions in the local coordinate system;
  an updating unit configured to update the posture angle of the operation device in the global coordinate system based at least in part on information of the global angular velocity converted by the coordinate conversion unit; and
  a control unit configured to cause the coordinate conversion unit to convert the first angular velocity acquired by the acquisition unit at the start of the operation into the global angular velocity using information of the initial posture angle calculated by the initial posture angle calculation unit, and to convert a second angular velocity acquired after the acquisition of the first angular velocity into the global angular velocity using information of the updated posture angle, and not information of inertial acceleration of the operation device occurring between the start of the operation and the acquisition of the second angular velocity.

2. The information processing device according to claim 1, wherein the coordinate conversion unit converts the acceleration acquired by the acquisition unit into global acceleration in the global coordinate system based at least in part on information of a posture angle of the operation device updated by the updating unit.

3. The information processing device according to claim 1, further comprising:
  a determination unit configured to determine that an operation of the operation device has been started by the user using information of at least one of the acceleration, the angular velocity and the magnetic intensity acquired by the acquisition unit.

4. The information processing device according to claim 1, wherein an operation target of the operation device is a three-dimensional image displayed on the screen of a display device which is electrically connected to the information processing device.

5. An information processing system comprising: an operation device which includes an acceleration sensor having an orthogonal three-axis detection axis, an angular velocity sensor having the orthogonal three-axis detection axis, a magnetic sensor having the orthogonal three-axis detection axis in a local coordinate system, and a transmission unit configured to transmit information of acceleration, angular velocity, and magnetic intensity detected by the acceleration sensor, the angular velocity sensor, and the magnetic sensor, respectively,
  the operation unit being configured for operation in an arbitrary posture by a user in a three-dimensional space; and a control device which includes: a reception unit configured to receive the information transmitted from the operation device,
  a coordinate conversion unit configured to convert a first angular velocity received from the operation device into global angular velocity in a global coordinate system using information of posture angles of the operation device in the global coordinate system indicating the three-dimensional space,
  an initial posture angle calculation unit configured to calculate a posture angle of the operation device, in an initial stage in the global coordinate system of the operation device out of the posture angles based at least in part on acceleration information and magnetic intensity information received by the reception unit at a start of an operation of the operation device by the user, the acceleration information consisting of gravitational acceleration information and not inertial acceleration information, the magnetic intensity information comprising magnetic intensities detected by the magnetic sensor in each of the three axis directions in the local coordinate system,
  an updating unit configured to update the posture angle of the operation device in the global coordinate system based at least in part on information of the global angular velocity converted by the coordinate conversion unit, and
  a control unit configured to cause the coordinate conversion unit to convert the first angular velocity received by the reception unit at the start of the operation into the global angular velocity using information of the initial posture angle calculated by the initial posture angle calculation unit and to convert a second angular velocity received after the reception of the first angular velocity into the global angular velocity using information of the updated posture angle, and not information of inertial acceleration of the operation device occurring between the start of the operation and the acquisition of the second angular velocity.

6. An information processing method comprising acts of:
  acquiring information of acceleration, angular velocity, and magnetic intensity of an operation device, which includes an acceleration sensor having an orthogonal three-axis detection axis, an angular velocity sensor having the orthogonal three-axis detection axis, and a magnetic sensor having the orthogonal three-axis detection axis in a local coordinate system, the operation device being configured for operation in an arbitrary posture by a user in a three-dimensional space, the acceleration information being detected by the acceleration sensor, the angular velocity information being detected by the angular velocity sensor, and the magnetic intensity information being detected by the magnetic sensor;
  calculating a posture angle of an initial stage out of posture angles of the operation device in a global coordinate system indicating the three-dimensional space based at least in part on acceleration information and magnetic intensity information acquired at a start of an operation of the operation device by the user, the acceleration information consisting of gravitational acceleration information and not inertial acceleration information, the magnetic intensity information comprising magnetic intensities detected by the magnetic sensor in each of the three axis directions in the local coordinate system;

converting a first angular velocity acquired at the start of the operation into a global angular velocity in the global coordinate system using the calculated posture angle of the initial stage;

calculating a new posture angle instead of the posture angle of the initial stage based at least in part on information of the converted global angular velocity; and converting a second angular velocity acquired after the acquisition of the first angular velocity into the global angular velocity using information of the calculated new posture angle, and not information of inertial acceleration of the operation device occurring between the start of the operation and the acquisition of the second angular velocity.

* * * * *